United States Patent
Oechsle

(10) Patent No.: US 8,776,525 B2
(45) Date of Patent: Jul. 15, 2014

(54) GAS TURBINE ENGINE AND COMBUSTOR

(75) Inventor: Victor L. Oechsle, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 336 days.

(21) Appl. No.: 12/976,092

(22) Filed: Dec. 22, 2010

(65) Prior Publication Data

US 2012/0067051 A1 Mar. 22, 2012

Related U.S. Application Data

(60) Provisional application No. 61/290,744, filed on Dec. 29, 2009.

(51) Int. Cl.
*F02C 1/00* (2006.01)
*F02G 3/00* (2006.01)

(52) U.S. Cl.
USPC ............ 60/752; 60/740; 60/744; 60/745; 60/755; 60/756; 60/757; 60/758; 60/759; 60/760

(58) Field of Classification Search
USPC ............ 60/805, 806, 752–760, 740–748
See application file for complete search history.

(56) References Cited

U.S. PATENT DOCUMENTS

| | | | |
|---|---|---|---|
| 3,381,471 A | 5/1968 | Szydlowski | |
| 3,820,324 A * | 6/1974 | Grindley et al. | 60/738 |
| 3,932,988 A | 1/1976 | Beaufrere | |
| 4,040,251 A * | 8/1977 | Heitmann et al. | 60/804 |
| 4,232,526 A * | 11/1980 | Barbeau | 60/745 |
| 4,819,424 A | 4/1989 | Bak | |
| 4,996,838 A | 3/1991 | Melconian | |
| 5,224,339 A * | 7/1993 | Hayes | 60/39.43 |
| 5,265,425 A | 11/1993 | Howell | |
| 5,323,602 A | 6/1994 | Defever | |
| 5,488,829 A * | 2/1996 | Southall et al. | 60/725 |
| 6,059,560 A | 5/2000 | Richards et al. | |
| 6,453,676 B1 | 9/2002 | Ho et al. | |
| 2004/0083737 A1 | 5/2004 | Wright | |
| 2007/0107437 A1 | 5/2007 | Evulet et al. | |
| 2007/0234733 A1* | 10/2007 | Harris et al. | 60/776 |

OTHER PUBLICATIONS

International Search Report, PCT/US2010/062356, Rolls-Royce North American Technologies Inc., Nov. 28, 2011.
Trazzi et al., Design and Development of a 70 N Thrust Class Turbojet Engine, Engenharia Termica (Thermal Engineering), No. 5, Jun. 2004 p. 9-14.

* cited by examiner

*Primary Examiner* — Craig Kim

(74) *Attorney, Agent, or Firm* — Krieg DeVault LLP

(57) ABSTRACT

The present invention provides in one embodiment a unique gas turbine engine. Another embodiment is a unique gas turbine engine combustion system. Still another embodiment is a unique gas turbine engine combustor. Other embodiments include apparatuses, systems, devices, hardware, methods, and combinations for gas turbine engines and gas turbine engine combustion systems and combustors.

16 Claims, 2 Drawing Sheets

US 8,776,525 B2

GAS TURBINE ENGINE AND COMBUSTOR

CROSS REFERENCE TO RELATED APPLICATIONS

The present application claims the benefit of U.S. Provisional Patent Application 61/290,744, filed Dec. 29, 2009, and is incorporated herein by reference.

GOVERNMENT RIGHTS

The present application was made with United States government support under Contract No. F33615-03-D-2357-0002, awarded by the United States Air Force. The United States government may have certain rights in the present application.

FIELD OF THE INVENTION

The present invention relates to gas turbine engines, and more particularly, to a gas turbine engine combustor.

BACKGROUND

Combustion systems in gas turbine engines remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique gas turbine engine combustion system. Still another embodiment is a unique gas turbine engine combustor. Other embodiments include apparatuses, systems, devices, hardware, methods, and combinations for gas turbine engines and gas turbine engine combustion systems and combustors. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
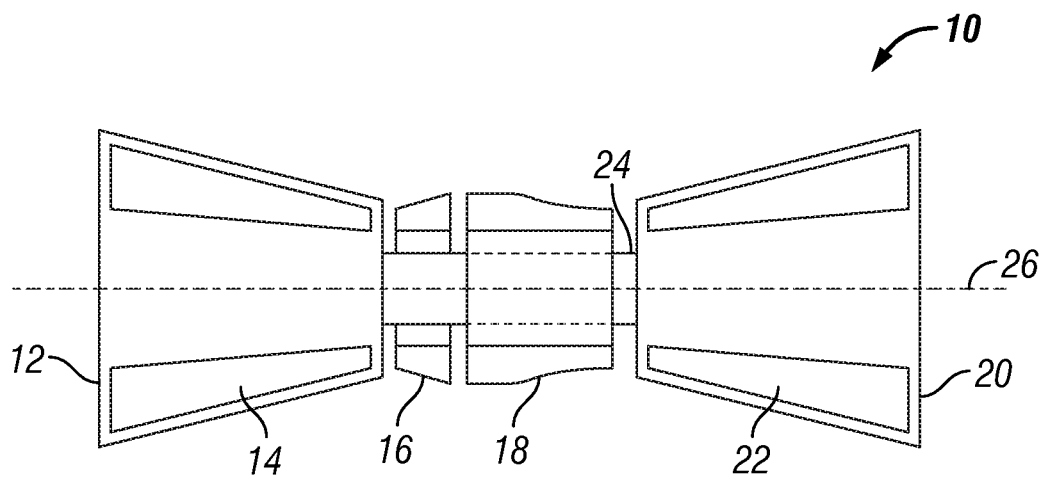
FIG. 1 schematically illustrates a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a non-limiting example of a gas turbine engine 10 in accordance with an embodiment of the present invention is schematically depicted. In one form, gas turbine engine 10 is an axial flow machine, e.g., an air-vehicle power plant. In other embodiments, gas turbine engine 10 may be a radial flow machine or a combination axial-radial flow machine. It will be understood that embodiments of the present invention include various gas turbine engine configurations, for example, including turbojet engines, turbofan engines, turboprop engines, and turboshaft engines having axial, centrifugal and/or axi-centrifugal compressors and/or turbines. In addition, embodiments of the present invention include combined cycle engines.

In the illustrated embodiment, gas turbine engine 10 includes a compressor 12 having a plurality of blades and vanes 14; a diffuser 16; a combustion system 18; a turbine 20 having a plurality of blades and vanes 22; and a shaft 24 coupling compressor 12 with turbine 20. Combustion system 18 is in fluid communication with compressor 12 and turbine 20. Turbine 20 is drivingly coupled to compressor 12 via shaft 24. Compressor 12, turbine 20 and shaft 24 rotate about an engine centerline 26. Although only a single spool is depicted, it will be understood that embodiments of the present invention include multi-spool engines having any number of spools. The number of stages of blades and vanes 14 of compressor 12, and the number of blades and vanes 22 of turbine 20 may vary with the application, e.g., the power output requirements of a particular installation of gas turbine engine 10. In various embodiments, gas turbine engine 10 may include one or more fans, additional compressors and/or additional turbines in one or more stages.

During the operation of gas turbine engine 10, air is received at the inlet of compressor 12. Blades and vanes 14 compress the air received at the inlet of compressor 12, and after having been compressed, the air is discharged via into combustion system 18. Engine 10 may include a diffuser downstream of compressor 12 to reduce the velocity of the pressurized air discharged from compressor 12. The pressurized air discharged from compressor 12 is mixed with fuel and combusted in combustion system 18, and the hot gases exiting combustion system 18 are directed into turbine 20. Turbine 20 extracts energy from the hot gases to, among other things, generate mechanical shaft power to drive compressor 12 via shaft 24. In one form, the hot gases exiting turbine 20 are directed into a nozzle (not shown), which provides thrust output for gas turbine engine 10. In other embodiments, additional compressor and/or turbine stages in one or more additional rotors upstream and/or downstream of compressor 12 and/or turbine 20 may be employed, e.g., in single or multi-spool gas turbine engines.

Figure 2:
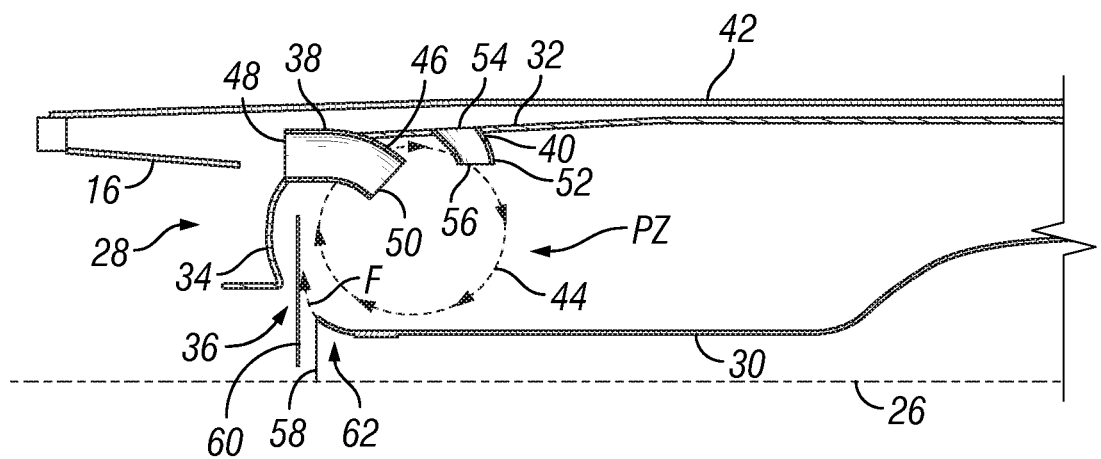
FIG. 2 schematically illustrates a non-limiting example of a gas turbine engine combustion system in accordance with an embodiment of the present invention.
Figure 3:
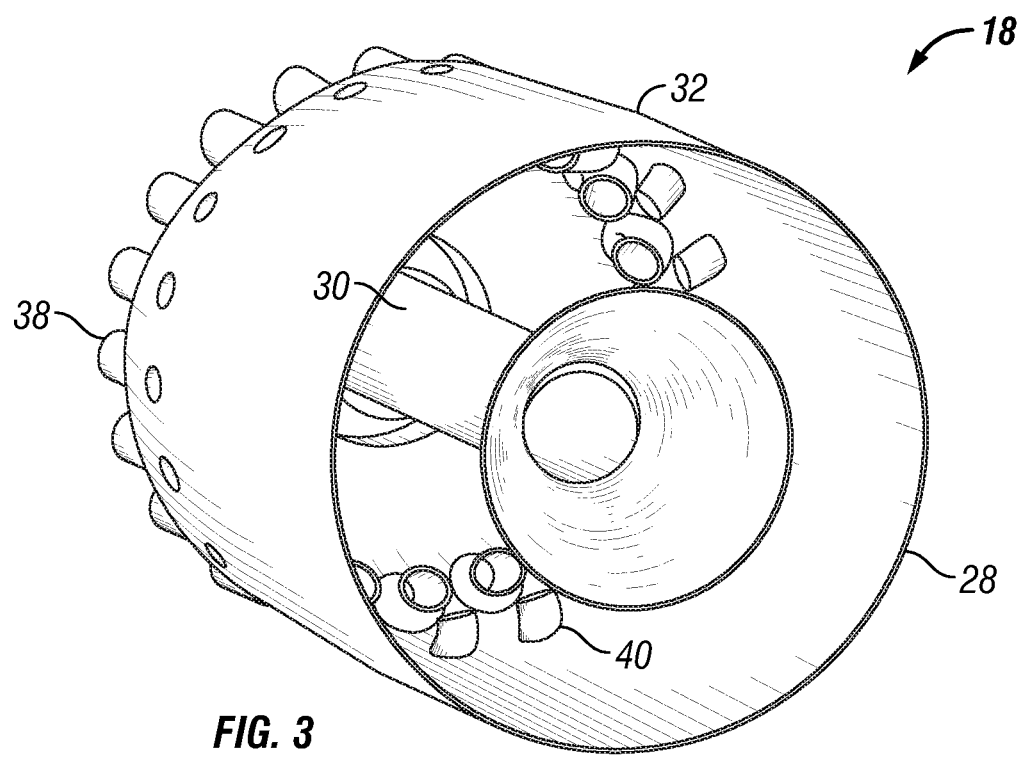
FIG. 3 is a perspective view of the gas turbine engine combustion system of the embodiment of FIG. 2.
Figure 4:
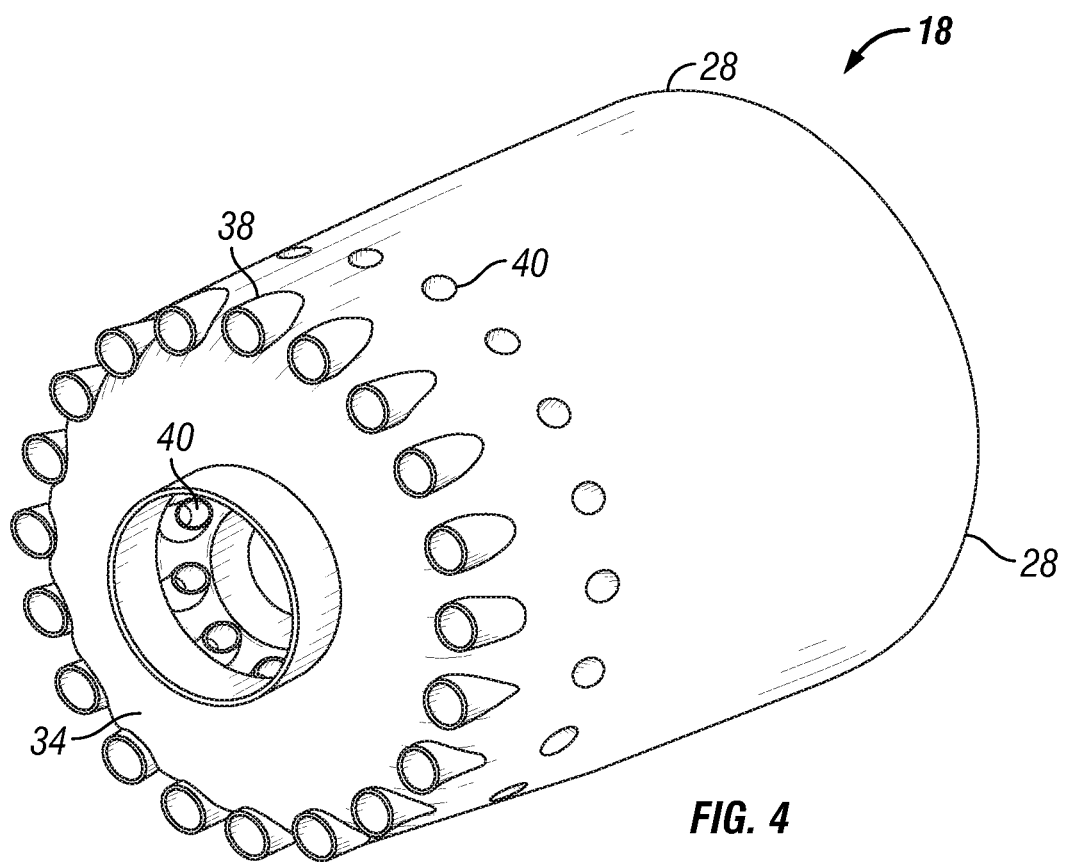
FIG. 4 is another perspective view of the gas turbine engine combustion system of the embodiment of FIG. 2.

Referring now to FIGS. 2-4, a non-limiting example of combustion system 18 in accordance with an embodiment of the present invention is schematically depicted. Combustion system 18 includes a recirculation combustor 28 and a slinger injector 30. In one form combustor 28 is an annular combustor disposed about centerline 26 of engine 10.

Combustor 28 includes an outer annular combustion liner 32, an annular end wall 34, a continuous annular fuel injection zone 36, a plurality of compressor discharge air injectors 38, and a plurality of air scoops 40. Combustor 28 is disposed inside an engine case 42 about centerline 26. In one form, combustor 28 is a single-sided annular combustor. In other embodiments, combustor 28 may not be a single-sided combustor. As a single-sided combustor, combustor 28 does not include a fixed inner annular combustion liner to help form the primary combustion zone or primary zone PZ of combustor 28. In other embodiments, combustor 28 may include an inner annular combustion liner that extends partially or fully along the length of outer annular combustion liner 32 to contain the PZ.

Compressor discharge air injectors 38 and air scoops 40 are parts of a ducting system that enforces recirculation in combustor 28 to stabilize a combustion process in the form of a flame in the PZ of combustor 28. The PZ of combustor 28 is structured to support a recirculation vortex 44 sufficient to prevent fuel from hitting the walls of combustor 28, e.g., outer annular combustion liner 32 and annular end wall 34, by trapping the fuel and burning it in the primary zone. In one form, annular end wall 34 has a geometric shape that facilitates the formation of recirculation vortex 44 inside combustor 28. In one form, end wall 34 has a cross-sectional shape of a dome, and may be referred to as a dome panel. In other embodiments, end wall 34 may have other geometric configurations. In one form, end wall 34 and combustion liner 32 are integrally formed. In other embodiments, end wall 34 and combustion liner 32 may be separately formed and subsequently assembled and/or joined together.

Compressor discharge air injectors 38 are spaced apart circumferentially around combustor 28. Compressor discharge air injectors 38 are operative to initiate recirculation vortex 44 in the PZ inside combustor 28. In one form, air injectors 38 are formed integrally with combustor 28. In other embodiments, air injectors 38 may be separately formed and subsequently affixed to combustor 28. In one form, compressor discharge air injectors 38 extend inside of combustor 28. In one form, compressor discharge air injectors 38 are curved tubes that extend from end wall 34 to the PZ inside combustor 28. In one form, air injectors 38 have an end 46 that is disposed adjacent to and abuts recirculation vortex 44. In another form, end 46 is disposed partially or completely inside recirculation vortex 44.

Compressor discharge air injectors 38 include an opening 48 and an opening 50. In one form, opening 48 is positioned to receive the total pressure of the air discharged by compressor 12 and diffused by diffuser 16. In other embodiments, injectors 38 may be positioned otherwise. Opening 50 is positioned to discharge pressurized air into recirculation vortex 44. The illustrated embodiment employs 20 compressor discharge air injectors 38. Greater or lesser numbers of air injectors 38 may be employed in other embodiments.

Air scoops 40 are spaced apart circumferentially around combustor 28. In one form, air scoops 40 extend inside combustor 28. Air scoops 40 are operative to confine the recirculation vortex 44 initiated by air injectors 38. In other embodiments, air scoops 40 may not extend inside combustor 28. In one form, air scoops 40 are formed integrally with combustor 28. In other embodiments, air scoops 40 may be separately formed and subsequently affixed to combustor 28. In one form, air scoops 40 are curved tubes that extend from combustion liner 32 to the PZ inside combustor 28. In one form, air scoops 40 have an end 52 that is disposed adjacent to and abuts recirculation vortex 44. In other embodiments, end 52 may be disposed partially or completely inside recirculation vortex 44. In still other embodiments, end 52 may not be adjacent to recirculation vortex 44, and air scoops 40 may be otherwise configured to confine recirculation vortex 44.

Air scoops 40 include an opening 54 and an opening 56. In one form, opening 54 is positioned to receive the static pressure of the air discharged by compressor 12 and diffused by diffuser 16. In other embodiments, air scoops 40 may be positioned otherwise. Opening 56 is positioned to discharge pressurized air to limit the extent of recirculation vortex 44. The illustrated embodiment employs 20 air scoops 40. Greater or lesser numbers of air scoops 40 may be employed in other embodiments.

Slinger injector 30 is operative to inject fuel into combustor 28. In one form, slinger injector 30 is a body of revolution. Slinger injector 30 includes an opening 58 for injecting fuel F into combustor 28 in a fuel injection plane 60 that intersects with continuous annular fuel injection zone 36. In one form, opening 58 is a circumferentially continuous opening at the forward end 62 of slinger injector 30 that provides a circumferentially continuous discharge of fuel into continuous annular fuel injection zone 36. In other embodiments, opening 58 may employ a plurality of discrete openings in the body of revolution for discharging fuel. In one form, slinger injector 30 rotates with engine shaft 24, i.e. at the same rotational speed as engine shaft 24 and about the same axis as engine shaft 24, i.e., centerline 26. In other embodiments, slinger injector 30 may rotate at a different speed than shaft 24 and/or may rotate about a different axis of rotation than engine shaft 24. In one form, slinger injector 30 is affixed to shaft 24. In other embodiments, slinger injector 30 may be integral with shaft 24 or may be otherwise coupled to shaft 24.

Slinger injector 30 is supplied with fuel by a fuel metering and delivery system (not shown). Slinger injector 30 is operative to impart centrifugal pressurization of the fuel by rotation of slinger injector 30, and to thereby inject the fuel into combustor 28. That is, as slinger injector 30 rotates, it centrifugally forces fuel from the interior of the body of revolution to exit opening 58 and enter continuous annular fuel injection zone 36 of combustor 28 about fuel injection plane 60. In one form, slinger injector 30 is designed so that the radially discharged fuel exiting slinger injector 30 helps to form recirculation zone 44 in combustor 28.

The size and shape of combustor 28; the size, shape, orientation and location of air injectors 38 and air scoops 40; the penetration of air injectors 38 and air scoops 40 into combustor 28; and the location of fuel injection plane 60 may be selected based on analysis via computational fluid dynamics.

Embodiments of the present invention include a gas turbine engine, comprising: a compressor; a turbine; and a combustion system in fluid communication with the compressor and the turbine, wherein the combustion system includes a slinger injector and a single-sided recirculation combustor.

In a refinement, the combustor is an annular combustor having a continuous annular fuel injection zone.

In another refinement, the engine further comprises an engine shaft coupling the compressor and the turbine, wherein the slinger injector rotates with the engine shaft.

In yet another refinement, the slinger injector is affixed to or integral with the engine shaft.

In still another refinement, the combustor includes a compressor discharge air injector that extends inside of the combustor.

In yet still another refinement, the compressor discharge air injector is operative to initiate a recirculation vortex in a primary zone of the combustor.

In a further refinement, the compressor discharge air injector includes an inlet exposed to a total pressure of air exiting the compressor.

In a yet further refinement, the compressor discharge air injector is a plurality of discrete air injectors spaced apart circumferentially around the combustor.

In a still further refinement, an air scoop extends inside the combustor and is operative to confine a recirculation vortex initiated by the compressor discharge air injector.

Embodiments of the present invention include a gas turbine engine, comprising: a compressor; a turbine; means for containing a combustion process; and means for introducing fuel into the means for containing.

In a refinement, the means for containing the combustion process is a single-sided recirculation combustor.

In another refinement, the means for containing the combustion process includes means for initiating a recirculation vortex in a primary zone of the combustor.

In yet another refinement, the means for containing the combustion process includes means for confining the recirculation vortex.

In still another refinement, the means for introducing fuel is rotating.

In yet still another refinement, an engine shaft couples the compressor and the turbine, and the means for introducing fuel rotates with the engine shaft.

Embodiments include a gas turbine engine combustion system, comprising: a recirculation combustor operative to receive pressurized air from a gas turbine engine compressor and discharge combustion products to a gas turbine engine turbine, including: an outer annular combustion liner; an annular end wall; a continuous annular fuel injection zone; and a compressor discharge air injector that extends inside of the combustor from one or both of the outer annular combustion liner and the annular end wall, wherein the compressor discharge air injector is operative to initiate a recirculation vortex in a primary zone of the combustor.

In a refinement, wherein the compressor discharge air injector is a plurality of discrete air injectors spaced apart circumferentially around the combustor.

In another refinement, an air scoop extends inside the combustor, and the air scoop is operative to confine the recirculation vortex initiated by the compressor discharge air injector.

In yet another refinement, the air scoop is a plurality of discreet air scoops spaced apart circumferentially around the combustor.

In still another refinement, the air scoop includes an end disposed within the recirculation vortex initiated by the compressor discharge air injector.

In yet still another refinement, the compressor discharge air injector is positioned on the combustor to receive a total pressure of air discharged by the compressor; and the air scoop is positioned to receive a static pressure of air discharged by the compressor.

In a further refinement, the combustor is a single-sided combustor.

In a yet further refinement, the system includes a slinger injector operative to sling fuel into the continuous annular fuel injection zone.

In a still further refinement, the slinger injector is operative to provide a circumferentially continuous discharge of fuel into the continuous annular fuel injection zone.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
a compressor;
a turbine; and
a combustion system in fluid communication with the compressor and the turbine, wherein the combustion system includes a slinger injector and a single-sided recirculation combustor configured to generate a primary combustion zone having a recirculation vortex within the single-sided recirculation combustor,
wherein the single-sided recirculation combustor includes a tubular compressor discharge air injector having an inlet exposed to the total pressure of the air exiting the compressor, and wherein the compressor discharge air injector is configured to discharge pressurized air into the recirculation vortex; and
wherein the single-sided recirculation combustor includes an air scoop disposed downstream of the tubular compressor discharge air injector, and wherein the air scoop is configured to confine the vortex.

2. The gas turbine engine of claim 1, wherein the single-sided recirculation combustor is an annular combustor having a continuous annular fuel injection zone.

3. The gas turbine engine of claim 1, further comprising an engine shaft coupling the compressor and the turbine, wherein the slinger injector rotates with the engine shaft.

4. The gas turbine engine of claim 3, wherein the slinger injector is affixed to or integral with the engine shaft.

5. The gas turbine engine of claim 1, wherein the tubular compressor discharge air injector extends inside of the single-sided recirculation combustor.

6. The gas turbine engine of claim 5, wherein the compressor discharge air injector is operative to initiate a recirculation vortex in a primary zone of the single-sided recirculation combustor.

7. The gas turbine engine of claim 5, wherein the tubular compressor discharge air injector is a plurality of discrete air injectors spaced apart circumferentially around the single-sided recirculation combustor.

8. The gas turbine engine of claim 5, wherein the air scoop extends inside the single-sided recirculation combustor.

9. A gas turbine engine combustion system, comprising:
a recirculation combustor operative to receive pressurized air from a gas turbine engine compressor and discharge combustion products to a gas turbine engine turbine, including:
an outer annular combustion liner;
an annular end wall;
a continuous annular fuel injection zone; and
a compressor discharge air injector that extends inside of the recirculation combustor from one or both of the outer annular combustion liner and the annular end wall, wherein the compressor discharge air injector is operative to initiate a recirculation vortex in a primary combustion zone of the recirculation combustor, wherein the compressor discharge air injector is positioned on the recirculation combustor to receive the total pressure of the air discharged by the compressor, wherein the recirculation combustor is configured to generate the primary combustion zone having a recirculation vortex therein; and wherein the compressor discharge air injector is configured to discharge pressurized air into the recirculation vortex;

wherein the recirculation combustor includes an air scoop disposed downstream of the compressor discharge air injector; and wherein the air scoop is configured to confine the vortex.

10. The gas turbine engine combustion system of claim 9, wherein the compressor discharge air injector is a plurality of discrete air injectors spaced apart circumferentially around the recirculation combustor.

11. The gas turbine engine combustion system of claim 9, wherein the air scoop is a plurality of discreet air scoops spaced apart circumferentially around the recirculation combustor.

12. The gas turbine engine combustion system of claim 9, wherein the air scoop includes an end disposed within the recirculation vortex initiated by the compressor discharge air injector.

13. The gas turbine engine combustion system of claim 9, wherein the air scoop is positioned to receive the static pressure of the air discharged by the compressor.

14. The gas turbine engine combustion system of claim 9, wherein the recirculation combustor is a single-sided combustor.

15. The gas turbine engine combustion system of claim 9, further comprising a slinger injector operative to sling fuel into the continuous annular fuel injection zone.

16. The gas turbine engine combustion system of claim 15, wherein the slinger injector is operative to provide a circumferentially continuous discharge of fuel into the continuous annular fuel injection zone.

* * * * *